United States Patent Office 2,889,266
Patented June 2, 1959

2,889,266
BORON ZINC OXIDE AND BORON MAGNESIUM OXIDE CATALYSTS FOR CONVERSION OF HYDROCARBONS

Edward G. Baker, Summit, and Isidor Kirshenbaum, Union, N.J., assignors to Esso Research and Engineering Company, a corporation of Delaware No Drawing. Application January 27, 1955
Serial No. 484,590

4 Claims. (Cl. 208—114)

This invention relates to new catalysts useful for the conversion of hydrocarbons.

Various catalysts are known for the conversion of hydrocarbons such as the cracking, reforming, hydroforming, dehydrogenating etc. of petroleum hydrocarbons. For example, silica-alumina and silica-magnesia catalysts are known for catalytic cracking. Molybdenum oxide on alumina is known for hydroforming. Various other combinations of metal oxides have been disclosed in the prior art.

According to the present invention new catalyst compositions are disclosed which can be used as such for catalytic conversions of hydrocarbons, more particularly catalytic cracking, or may be used as catalyst supports for the production of other catalyst compositions. More particularly, according to the present invention the catalyst composition is produced by intimately combining boron oxide with magnesium oxide or zinc oxide.

Boron oxide has previously been combined with alumina to produce a cracking catalyst or with silica-alumina to produce a cracking catalyst but the catalysts have not proved successful because during the cracking operation including the regeneration step, relatively high temperatures are encountered and these high temperatures together with the steam present have resulted in volatilization of the boron oxide from the catalyst. This not only reduced the activity of the catalyst but fouling of the equipment resulted as the volatilized or sublimed boron oxide deposited in the equipment and caused plugging of the lines, etc.

According to the present invention new catalyst compositions are produced which make a more olefinic and less aromatic gasoline than does commercial silica-alumina catalyst when used in a catalytic cracking process. In the present catalyst compositions containing boron oxide, the boron oxide is held more tenaciously and the loss of boron oxide on heating the catalyst is much less than with boron oxide-containing catalysts in the prior art. In the preferred form of the invention the magnesia and boron oxide or zinc oxide and boron oxide are coprecipitated from solutions of these compounds. However, other methods of preparation may be used. The catalyst formed by reacting a magnesium compound with boric acid is preferred because it is more stable than the catalyst formed by reacting a zinc compound with boric acid. The preferred weight composition ranges for the magnesium borate catalyst of the present invention are about 35 to 65% MgO and 65 to 35% $B_2O_3$ and for the zinc borate catalyst about 50 to 80% ZnO and 50 to 20% $B_2O_3$.

It is believed that magnesium borates and zinc borates are formed during the reaction of the selected materials but the invention is not to be restricted to this explanation. Also the borates may have varying proportions of the magnesia or zinc oxide and the boron oxide. Or the magnesium borates or zinc borates may be mixtures of different $MgO-B_2O_3$ or $ZnO-B_2O_3$ compounds. It is known that magnesium borates exist as compounds such as $3MgO \cdot B_2O_3$; $2MgO \cdot B_2O_3$; and $MgO \cdot B_2O_3$. Zinc borate exists as $3ZnO \cdot B_2O_3$.

The catalyst compositions of the present invention are excellent hydrocarbon cracking catalysts for the production of motor fuel, such as gasoline. The catalyst compositions may be used for polymerization of hydrocarbons or reforming of naphthas. The present catalyst compositions may be used as catalyst supports or bases for other catalytic materials.

Methods of preparing the catalysts will now be given generally and later in the form of specific examples. The examples are by way of illustration only and the invention is not to be limited thereto. For the preparation of the magnesia-boria catalyst the preferred method is to dissolve a water soluble magnesium salt or compound in water and then add boric acid thereto. Then an alkaline compound is added to precipitate the borate catalyst hydrogel. Sufficient alkaline compound is added until there is no longer any precipitate formed. The precipitate is then filtered off or dewatered in any manner, dried at an elevated temperature and then heated at a high temperature for a relatively long time. The zinc oxide-boron oxide catalyst is prepared in a similar manner starting with a water soluble zinc salt or compound.

In another method the solution of the magnesium compound or the zinc compound is treated with an alkaline material to precipitate the corresponding hydroxide which is recovered and washed. The washed magnesium hydroxide or zinc hydroxide is mulled with boric acid or aqueous boric acid solution and the resulting mixture dried and calcined.

EXAMPLE 1

For the preparation of the magnesium oxide-boron oxide catalyst, about 1,560 grams of magnesium nitrate were dissolved in about 5 liters of water. About 370 g. of boric acid were then added and dissolved in the solution, sufficient heat being applied to hasten solution. Then a 1.2 normal ammonium hydroxide solution was added slowly with mixing, to precipitate the metals as hydroxides, until the pH was 7. Additional ammonium hydroxide was added until no further precipitation occurred and the pH was raised to between 9 and 10. The precipitate was then filtered, reslurried and washed with water and dried at about 400° F. for about 16 hours. The dried mixture was then calcined at 1200° F. for about 3 hours. The recovered catalyst contained about 45% by weight $B_2O_3$ and 55% by weight of MgO.

While magnesium nitrate was used in Example 1, the invention is not to be restricted thereto as other water soluble magnesium salts or compounds, such as magnesium acetate and magnesium chloride may be used.

EXAMPLE 2

For the preparation of zinc oxide-boron oxide catalyst, about 332 g. of zinc acetate were dissolved in about 2 liters of water. About 52.5 g. of boric anhydride were then added and dissolved in the solution by the application of heat. Then, 1.2 normal ammonium hydroxide was added to form the catalyst hydrogel and additional ammonium hydroxide was added to raise the pH of the solution to between 7 and 8. The precipitate was then filtered, washed with water, and dried at about 400° F. for about 16 hours. The dried mixture was then calcined at 1200° F. for about 3 hours. The recovered catalyst contained about 28% by weight $B_2O_3$ and about 72% by weight of ZnO.

While zinc acetate was used in Example 2 in the preparation of the catalyst the invention is not to be restricted thereto as other water soluble zinc salts or compounds, such as zinc chloride and zinc nitrate may be used.

A portion of each of the catalysts prepared according to Examples 1 and 2 was used for cracking East Texas gas oil in a 200 cc. fixed bed unit under conditions given in Table 1. The catalysts were in the form of 3/16" by 3/16" cylinders. The East Texas light gas oil had the following characteristics:

ASTM distillation—
- I.B.P. _____ °F__ 490
- 5% _____ °F__ 520
- 50% _____ °F__ 597
- 90% _____ °F__ 672
- F.B.P. _____ °F__ 700
- Aniline point _____ °F__ 173
- API gravity _____ °___ 33.7

The results of the cracking operation are given in Table 1. The catalyst identified as $SiO_2$—$Al_2O_3$ in Table 1 is commercial silica-alumina catalyst containing about 13% $Al_2O_3$. In Table 1, 430° F. conversion is total conversion to products boiling below 430° F., and is expressed as weight percent on feed.

Table 1

| 450° F. Conversion, Wt. Percent | 50 | 50 | 30 | 30 | 30 |
|---|---|---|---|---|---|
| Catalyst | MgO—$B_2O_3$ | $SiO_2$—$Al_2O_3$ | ZnO—$B_2O_3$ | MgO—$B_2O_3$ | $SiO_2$—$Al_2O_3$ |
| Temp. °F | 975 | 970 | 985 | 975 | 950 |
| Oil Feed Rate V./V./Hr | 0.40 | 1.20 | 0.95 | 0.65 | 2.00 |
| Cycle, hours | 2 | 1 | 1 | 2 | 1 |
| Yields, Wt. Percent: | | | | | |
| $C_5$—430° F. Gasoline | 28.5 | 28.0 | 19.7 | 19.7 | 19.7 |
| Carbon | 3.0 | 4.2 | 2.6 | 3.0 | 2.3 |
| $C_5$+Gasoline, Br$_2$ No. cg./ml | 83.5 | 40 | 74 | 86 | 39 |
| Aniline Pt., °F | 72 | 55 | 73 | 75 | 55 |
| API ° Gravity | 56 | 55 | 53 | 56 | 55 |

From the bromine number and aniline points in Table 1 it will be seen that the $C_5$—430° F. gasoline produced by using the catalysts prepared according to the present invention is more olefinic and less aromatic than the gasoline produced by using the commercial silica-alumina catalyst. Also it will be seen that at the higher conversion levels these improved catalysts form less carbon or coke than does the commercial silica-alumina catalyst.

Instead of using ammonium hydroxide as the precipitant other alkaline materials such as quaternary ammonium hydroxides, ethanol amines etc. may be used. Alkali such as sodium or potassium hydroxide may be used provided precautions are taken to remove most of the alkali metal from the final catalyst. Even small amounts of residual alkali are to be avoided in the final catalyst if optimum activity is to be obtained.

Other catalysts made according to the present invention were tested to determine boron oxide retention and were compared to a control catalyst comprising alumina-boron oxide containing about 16% by weight of boron oxide. The alumina-boron oxide catalyst was prepared by slurrying 87 grams of alumina gel (containing about 43 grams of $Al_2O_3$) for 3 hours in 2 liters of water that contained 5 cc. of glacial acetic acid. After drying the alumina gel at 400° F. for 16 hours, it was impregnated with 45 cc. of water containing 13.2 grams of boric acid. The catalyst was dried again at 400° F. for 16 hours and calcined for 3 hours at 1200° F. The MgO—$B_2O_3$ catalyst used contained about 65.2% $B_2O_3$ and the ZnO—$B_2O_3$ catalyst contained about 23.7% $B_2O_3$ before the steam test.

The results of the steaming test summarized in Table 2 indicate that the magnesia-boron oxide and zinc oxide-boron oxide catalysts of the present invention retain boron oxide better than the alumina-boron oxide catalyst, and that of the two, the magnesia-boron oxide catalyst was the more stable. The portions of MgO—$B_2O_3$ and ZnO—$B_2O_3$ catalysts were prepared similarly to Examples 1 and 2, except for composition, and were steamed at 850°–900° F. for 2½ hours at atmospheric pressure. The control catalyst was treated in the same manner.

Table 2

STABILITY OF BORON OXIDE-CONTAINING CATALYSTS—BORON OXIDE LOSS DURING STEAMING

| Catalyst | Wt. Percent Boron Oxide [1] | | |
|---|---|---|---|
| | Before Steaming | After Steaming | Percent Change |
| MgO—$B_2O_3$ | 65.2 | 62.0 | 4.9 |
| ZnO—$B_2O_3$ | 23.7 | 21.1 | 11.0 |
| 85 $Al_2O_3$—15 $B_2O_3$ | 16.4 | 12.2 | 25.6 |

[1] All catalysts samples were dried before the boron oxide content was determined.

Additional catalysts were prepared as follows:

EXAMPLE 3

Magnesia gel, prepared by precipitating magnesium hydroxide from a 2 liter aqueous solution of 419 grams of magnesium acetate with 29% $NH_4OH$ at a pH of 10, was impregnated with a solution of 35 grams of boric anhydride in water. The catalyst was dried at 250° F. for 48 hours and calcined for 8 hours at 1000° F. The fresh catalyst had a surface area of 102 m.$^2$/g. and contained 44 weight percent of MgO and 56 weight percent of $B_2O_3$.

EXAMPLE 4

332 grams of zinc acetate was dissolved in 2 liters of water and treated with 200 ml. of 29% $NH_4OH$ (½ stoichiometric amount) to precipitate hydrous zinc oxide. After filtering the ZnO precipitate, it was slurried with a solution of 53 grams of boric anhydride in 500 ml. of water. The slurry was filtered and dried at 400° F. The catalyst was heat activated according to the following schedule.

Heating at 850° F. for 3 hours, followed by
Heating at 1000° F. for 16 hours, followed by
Heating at 1200° F. for 5 hours.

The surface area of this catalyst was about 186 m.$^2$/g. after the calcination step and contained about 70 weight percent of ZnO and about 30 weight percent of $B_2O_3$.

Portions of the catalysts prepared according to Examples 3 and 4 were used in a cracking unit to crack East Texas gas oil having the characteristics above described in connection with Examples 1 and 2. The cracking runs were of 1 hour duration and were carried out at 975° F. and at a conversion level of 26%. The results of the cracking are given in Table 3.

Table 3

| 430° F. Conversion, wt. percent | 26 | 26 |
|---|---|---|
| Catalyst | MgO—$B_2O_3$ | ZnO—$B_2O_3$ |
| $C_5$—430° F. Gasoline, wt. percent | 18.9 | 17.1 |
| Carbon, wt. percent | 1.5 | 2.3 |
| $C_5$ Gasoline Inspections: | | |
| Br$_2$ No., cg./ml | 85.2 | 93.8 |
| Aniline Pt., °F | 75.1 | 65.5 |
| ° API Gravity | 56.2 | 57.4 |

The cracking temperature may be between about 850° and 1100° F. and the regeneration temperature for burning off carbon from the used catalyst may be between about 900° and 1200° F. The catalyst may be used in pill form in fixed or moving beds or in finely divided form in the fluid process.

According to the present invention silica-free improved cracking catalysts consisting essentially of magnesia-boron oxide or of zinc oxide-boron oxide are produced, and these catalysts show improved ability to retain the boria or boron oxide component.

What is claimed is:

1. A method of cracking higher boiling hydrocarbons to produce gasoline by contacting a higher boiling hydrocarbon oil at a cracking temperature between about 850° F. and 1100° F. for a selected time with a solid stable catalyst consisting essentially of about 35 to 65% by weight of boron oxide and the remainder magnesia to effect the desired extent of cracking to produce a gasoline which is more olefinic and less aromatic than gasoline produced by conventional catalytic cracking.

2. A method of cracking higher boiling hydrocarbons to produce gasoline by contacting a higher boiling hydrocarbon oil at a cracking temperature between about 850° F. and 1100° F. for a selected time with a solid stable catalyst consisting essentially of about 20 to 50% by weight of boron oxide and the remainder zinc oxide to effect the desired extent of cracking to produce a gasoline which is more olefinic and less aromatic than gasoline produced by conventional catalytic cracking.

3. A method of cracking higher-boiling hydrocarbons to produce gasoline by contacting a higher-boiling hydrocarbon oil at a cracking temperature between about 850° F. and 1100° F. for a selected time with a solid stable catalyst consisting essentially of about 45% by weight of boron oxide and the remainder magnesia to effect the desired extent of cracking to produce a gasoline which is more olefinic and less aromatic than gasoline produced by conventional catalytic cracking.

4. A method of cracking higher-boiling hydrocarbons to produce gasoline by contacting a higher-boiling hydrocarbon oil at a cracking temperature between about 850° F. and 1100° F. for a selected time with a solid stable catalyst consisting essentially of about 28% by weight of boron oxide and the remainder zinc oxide to effect the desired extent of cracking to produce a gasoline which is more olefinic and less aromatic than gasoline produced by conventional catalytic cracking.

References Cited in the file of this patent

UNITED STATES PATENTS

| | | |
|---|---|---|
| 1,813,478 | Andrussow et al. | July 7, 1931 |
| 1,873,520 | Woodward | Aug. 23, 1932 |
| 2,356,978 | Danford | Aug. 29, 1944 |
| 2,379,081 | Huppke et al. | June 26, 1945 |
| 2,407,918 | Burgin | Sept. 17, 1946 |
| 2,422,884 | Burgin | June 24, 1947 |
| 2,584,405 | West | Feb. 5, 1952 |

OTHER REFERENCES

Mellor: Inorganic and Theoretical Chem., vol. 5 (1924), pages 95–101.

Handbook of Chem. and Phys. (32nd Ed., 1950), pages 516 and 596.